United States Patent [19]

Palmer

[11] Patent Number: 5,662,009

[45] Date of Patent: Sep. 2, 1997

[54] DRIVE MECHANISM PROVIDING AN OSCILLATORY-ROTATIONAL-DRIVE INPUT AND A REVERSIBLE ROTATIONAL-DRIVEN-OUTPUT

[76] Inventor: Leon Robert Palmer, 81 Pennsylvania Ave., Somerset, Mass. 02726

[21] Appl. No.: 543,323

[22] Filed: Oct. 16, 1995

[51] Int. Cl.$^6$ ............................. F16H 27/02; F16H 31/00
[52] U.S. Cl. ............................. 74/810.1; 74/143; 475/221
[58] Field of Search ........................... 74/810.1, 143; 475/198, 221, 223, 225, 230, 203, 296, 297, 306, 307

[56] References Cited

U.S. PATENT DOCUMENTS

| | | | |
|---|---|---|---|
| 1,800,248 | 4/1931 | Coates | 475/221 X |
| 4,760,751 | 8/1988 | Kasamatsu | 74/810.1 X |
| 5,105,688 | 4/1992 | Williams, III | 74/810.1 |
| 5,136,888 | 8/1992 | Nix | 74/810.1 X |
| 5,333,517 | 8/1994 | Bryson et al. | 74/810.1 |

*Primary Examiner*—Charles A. Marmor
*Assistant Examiner*—Peter T. Kwon

[57] ABSTRACT

A drive mechanism provided with a forward and reverse input and a forward and reverse drive whereby a single output-member is caused to produce forward drive from forward-rotation, reverse-rotation and oscillatory-rotation applied to a single input-member whereby the reverse-rotation applied to the input-member is mechanically converted to usable forward drive through an arrangement of gears and one-way clutches and thereby doubling the efficiency of the input and drive while the single output-member can also be caused to produce reverse drive from forward-rotation, reverse-rotation and oscillatory-rotation applied to the input-member whereby the forward-rotation applied to the input is mechanically converted to usable reverse drive through an arrangement of gears and one-way clutches with forward drive being achieved by an identical pair of geared and spring-loaded pivotable selector mechanisms at the input and output end of the device pivotting into simultaneous engagement with the geared input member and a geared forward-rotation-mechanism designated for producing only forward drive and with reverse drive being achieved by the same pair of geared and spring-loaded selector mechanisms pivoting into simultaneous engagement with the geared input-member and geared reverse-rotation-mechanism designated for producing only reverse drive.

8 Claims, 11 Drawing Sheets

DRIVE MECHANISM PROVIDING AN OSCILLATORY-ROTATIONAL-DRIVE INPUT AND A REVERSIBLE ROTATIONAL-DRIVEN-OUTPUT

FIELD OF THE INVENTION

This invention pertains to the field of driving devices and more particularly to devices for producing forward-rotational-drive from both a forward and a reverse-rotational-input and a reverse-rotational-drive from both a forward and a reverse-rotational-input.

BACKGROUND OF THE INVENTION

The following is a description of some of the numerous application to which the applicant's mechanism can be adapted and virtually double the efficiency of those devices.

While using a ratchet wrench or ratchet screw driver only the forward rotation of the tool is productive during the fastening of hardware because the reverse rotation of the tool is wasted motion and effort spent on ratcheting-up for the next productive forward rotation. Likewise, only the reverse rotation of the tool is productive during the unfastening of hardware because the forward rotation of the tool is wasted motion and effort spent on ratcheting-up for the next productive reverse rotation. The applicant's mechanism can be adapted to a wrench or screw driver whereby both forward and reverse rotational input can be used to produce forward rotational drive to fasten hardware, and both forward and reverse rotational input can be used to produce reverse rotational drive to unfasten hardware and thereby doubling the capacity of the input and output. These tools fitted with the applicant's mechanism would be used in virtually any application in which a ratchet-type tool is currently used except the applicant's mechanism is double the efficiency of the ratchet mechanism.

While using a conventional manual can opener, approximately 180 degrees of forward rotation is applied to the crank to turn the rim-gripper and cutter wheels, the hand is then required to release its grip from the crank, rotate the wrist 180 degrees of wasted reverse rotational motion then regrasp the crank to apply another 180 degree forward rotation repeatedly until the lid is removed from the can. The applicant's mechanism can be adapted to the can opener between the crank and the rim-gripper wheel whereby 180 degrees of forward rotation input of the crank then 180 degrees of reverse rotational input to the crank repeatedly would progressively remove the lid from the can and thereby double the efficiency of the can opener.

The applicant's mechanism can be adapted to the pedalling system of a bicycle whereby instead of the conventional forward-pedalling motion to propel the bicycle forward, backward-pedalling motion and oscillatory-motion can be used to propel the bicycle forward.

The applicant's mechanism can be adapted to an arbor press between the ram and handle whereby the handle can simply hang straight down while the operator would only be required to push and pull the handle repeatedly and easily as the ram progresses toward the work piece. Retracting the ram away from the work piece would require the operator to simply reverse the selector mechanism to engage the retracting mode and simply pull and push the handle repeatedly as the ram progressively retracts away from the work piece thereby doubling the efficiency of the arbor press and significantly improving the ergonomics.

SUMMARY

The previous description of the applicant's invention along with the accompanying drawings which attempt to be self explanatory with arrows indicating the direction-of-rotation of each component helps one to realize and appreciate the mechanical advantages and applications of this forward and reverse rotational-input, forward and reverse rotational drive device.

One can appreciate the efficiency and ergonomic advantage of a device which enables a forward-rotational input to produce a forward-rotational-drive, a reverse-rotational-input to produce a forward-rotational-drive, a reverse-rotational-input to produce a reverse-rotational-drive and a forward-rotational input to produce a reverse-rotational-drive provided especially in a hand tool embodiment whereby all the physical effort and motion is productively utilized in comparison to a ratchet mechanism which limits the drive in one direction and ratchets in the opposite. The superiority of the applicant's device over the ratchet mechanism can be realized and supersedes the ratchet mechanism for the following reasons.

Machinists can attest to the difficulty of performing the machining to produce the intricate details of a ratchet mechanism such as the narrow channels and blind-recesses. Assembly-people can confirm the frustration and aggravations of handling and installing the miniature components which are required to be manually inserted into narrow channels and blind recesses which limit an assembler to rely solely on sense of-feel and hope the miniature parts are and remain in place. These components are spring-loaded and are thereby readily-catapulted out of place when accidentally mishandled and require reassembly.

The applicant's invention is a significant improvement over a ratcheting-mechanism for the following reasons;

ease of manufacture; most of the components of the invention such as gears, roller-clutches, retaining-rings, springs and shafts are standard and readily available stock items from suppliers where they are purchased at minimum cost in large quantities.

ease of assembly; roller-clutches are easily pressed into bores of bevel gears using a standard arbor-press with its high mechanical-advantage and ease of operation; pivotable and rotatable components are easily slid onto their associated shafts and retained in place with standard easily-installed retaining-rings; simple turning operations on a standard metal lathe are required to produce the multiple-diameter input-member and output-member and the grooves into which the retaining rings are installed; all subassemblies such as shafts with their mounted components and input-member and output-member with their mounted components are easily set and nested into their designated semi-circular recesses and channels provided in the back-section of housing; the front-section of housing is placed onto the entire assembly and fastened to the back-section with screws.

The soundless operation of the applicant's device is due to the use of roller-clutches for clutching and driving instead of the "infamous" clicking-sound associated with the ratchet-mechanism generated by the spring-loaded pawls repeatedly impacting the ratchet during overrun.

In ultra limited space situations the handle of a ratchet mechanism is not able to pivot enough to engage the pawl teeth with the ratchet teeth. Even with ultra small forward and reverse rotational movements of the input the applicant's device is still able to operate.

The accompanying drawings show spur-teeth gears for simplicity, but spiral-tooth gears are preferred because of their overlapping teeth contact, smooth rolling meshing, quiet operation and greater load-bearing and torque-transmitting capacity.

3

The components in the drawings are intentionally set in a spread-out arrangement in order to clearly display the components and their direction-of-rotation. The mechanism in actual embodiments, depending on the application, are extremely compacted for miniaturization and easy handling.

4

DESCRIPTION OF THE PREFERRED EMBODIMENT

Figure 1:
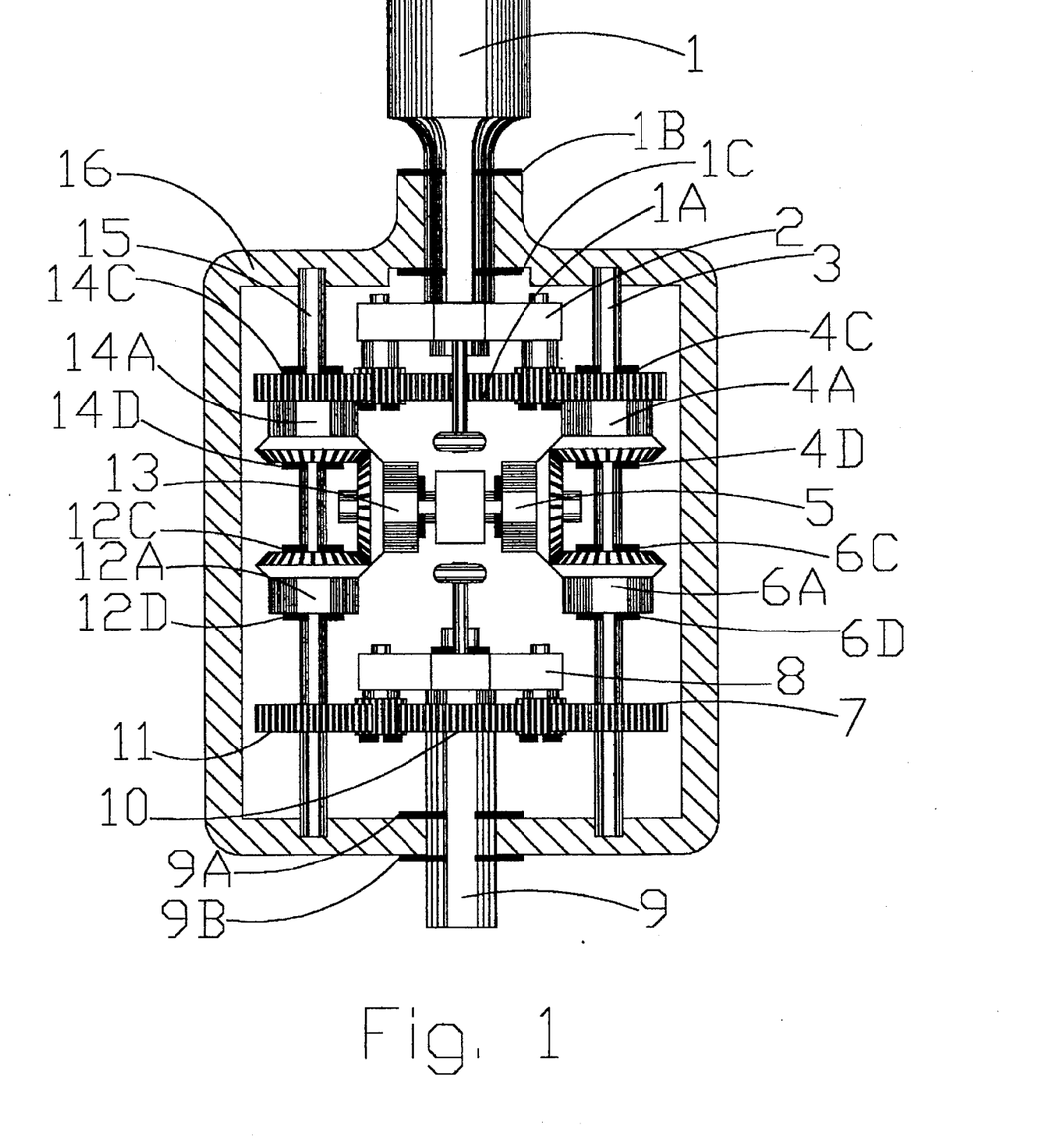
FIG. 1 Main drawing showing component arrangement and their identifying reference numerals.

Referring to FIG. 1 cylindrical input-member 1 is rotatably retained in upper bore of housing 16 by retaining rings 1B and 1C removably installed into grooves provided in input-member 1 at the internal and external surface of input bore. All gears shown in this mechanism are spur but can be helical or spiral tooth with spiral tooth being the preferred due their smooth meshing and load bearing capacity. Gear 1A is pressed onto the smaller diameter of the internal end of input-member 1 and facing the output, input-selector 2 is a Y-shaped member provided with a centralized bore for pivotably mounting onto internal smaller diameter of input-member 1 and resting on hub of gear 1A. A bore is provided near the end of each leg of Y-shaped input-selector 2. Pressed into one bore is a cylindrical and symmetrical post 2E and pressed into the other bore is an identical cylindrical and symmetrical post 2F. Post 2E and post 2F have a larger diameter shoulder which contacts the underside surface of input-selector 2 serving as a stop to prevent posts 2E and 2F from becoming pressed too far into their respective bores. Gear 2A is rotatably mounted to the free end of post 2F and retained in place with retaining ring 2G. Gear 2B is rotatably mounted to free end of post 2E and retained in place with retaining ring 2H.

Shaft 3 rotatably retained at both its ends in cylindrical cavities provided at the input and output end at the far right side of housing 16 is mounted at its upper end by compound-gear 4A consisting of a gear at one end and a bevel gear at the other with the bevel gear facing the output. One-way roller-clutch 4B is pressed into the bore of compound-gear 4A and disposed so as to clutch and drive shaft 3 only in clockwise rotation. Compound-gear 4A and roller-clutch 4B of FIG. 4 as an assembly are retained in place by retaining rings 4C and 4D as shown in FIG. 1.

As the compound-gear/roller-clutch assembly are caused to rotate clockwise, the rollers of the clutch are drawn to and become wedged between locking ramps provided in the clutch housing and shaft 3 to transmit torque between compound-gear/roller-clutch assembly and shaft. As the compound-gear/roller-clutch assembly is caused to rotate in reverse, while shaft 3 continues to be caused to rotate forward, roller of the clutch are caused to move away, become unwedged, from locking ramps of clutch housing and shaft 3 thereby causing compound-gear/roller-clutch assembly to override shaft 3.

Figure 15A:
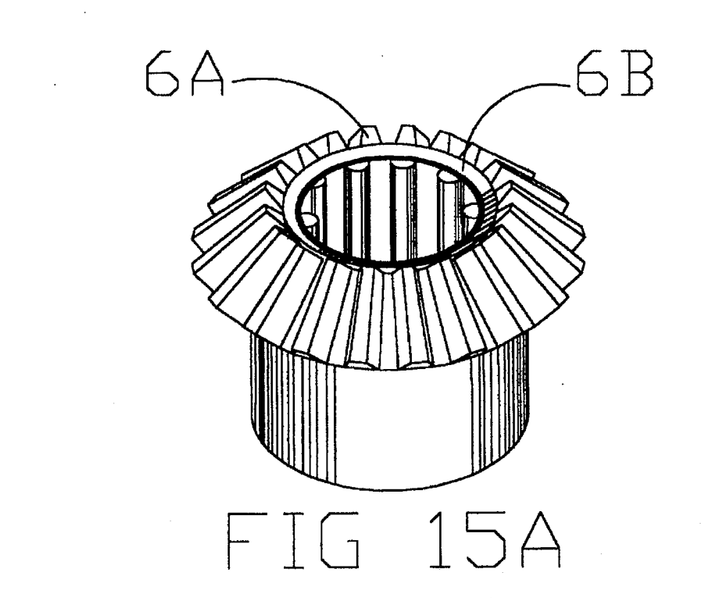
FIG 15A Shows one-way roller clutch 6B pressed into bore of mitre gear 6A; just as one-way roller-clutch 4B is pressed into bore of mitre gear 4A.

Pressed into bore of bevel-gear 6A is one-way roller-clutch 6B, as shown in FIG. 5A, identical in construction and disposition as roll clutch 4B. Back to FIG. 1, bevel-gear 6A/roller-clutch 6B assembly are rotatably mounted onto shaft and facing compound-gear 4A/roller-clutch 4B assembly, spaced apart from 4A/4B assembly in order for both compound-gear 4A and bevel-gear 6A to mesh simultaneously with bevel-gear 5 and retained in place on shaft 3 with retaining rings 6C and 6D.

Figure 15B:
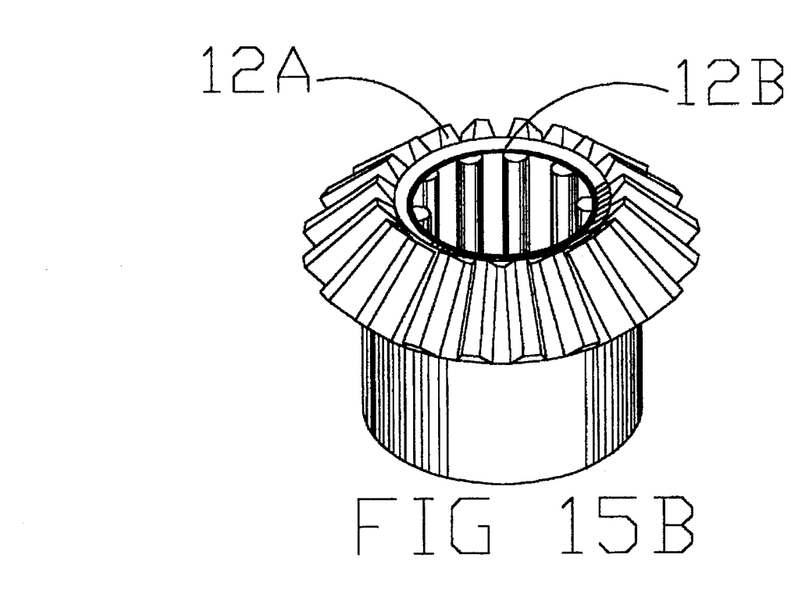
FIG. 15B Shows one-way roller clutch 12B pressed into bore of mitre gear 12A; just as one way roller-clutch 14B is pressed into bore of mitre gear 14A.

Shaft 15 rotatably retained at both its ends in cylindrical cavities provided at the far left side of housing 16 is parallel to shaft 3. Pressed into bore of compound-gear 4A, identical in construction and disposition as compound-gear 4A, is one-way roller-clutch 14B identical in construction to roller-clutches 4B and 6B except that roller-clutch 4B is reversely-disposed in order to clutch and drive shaft 15 only in reverse-rotation. Compound-gear 14A/roller-clutch 14B assembly are rotatably mounted onto upper end of shaft 15 and retained in place with retaining rings 4C and 14D provided at both ends of compound-gear 14A. Pressed into bore of bevel-gear 12A is one-way roller-clutch 12B, as shown in FIG. 15B, identical in construction to roller-clutch 14B and disposed the same as roller-clutch 12B so as to clutch and drive shaft 15 only in reverse-rotation. Back to FIG. 1, bevel-gear 12A is rotatably mounted onto shaft 15, retained in place with retaining rings 12C and 12D, facing the bevel-gear of compound-gear 14A and spaced apart from compound-gear 14A in order for both compound gear 14A and bevel-gear 12A to constantly mesh simultaneously with bevel-gear 3.

Figure 4:
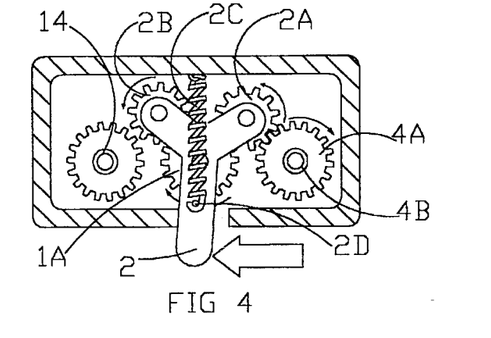
FIG. 4 Sectional view A—A of FIG. 2; input-selector-mechanism is retained in engagement with forward-rotation-mechanism with forward-rotation applied to the input; forward drive is produced.
Figure 5:
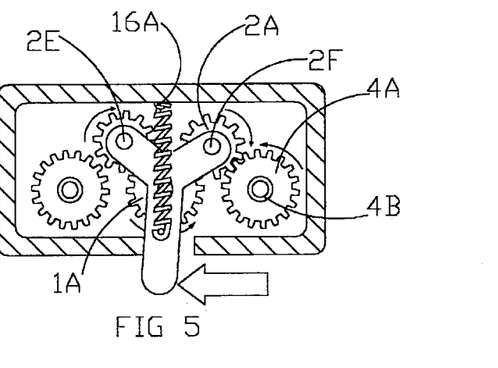
FIG. 5 Sectional view B—B of FIG. 3; input-selector-mechanism is retained in engagement with forward-rotation-mechanism with reverse-rotation applied to the input; forward drive is still produced.

Post 2D of FIG. 4 is pressed into bore provided centered an half-way way up handle of input-selector 2. Hook 16A of FIG. 5 is provided on inside upper back wall of housing 16C. Extension-spring 2C of FIG. 4 is stretchedly attached to post 2D and hook 16A. As handle of input-selector 2 is pushed to the left, as shown in FIG. 4 and FIG. 5, planetary-gear 2A, constantly engaged with gear 1A, roll into engagement with compound-gear 4A/roller-clutch 4B assembly to cause reverse-rotation at the output. Extension-spring 2C, constantly under load maintains the engagement between gear 1A and compound-gear 14A/roller-clutch 14B assembly by providing a torque on input-selector 2.

Figure 6:
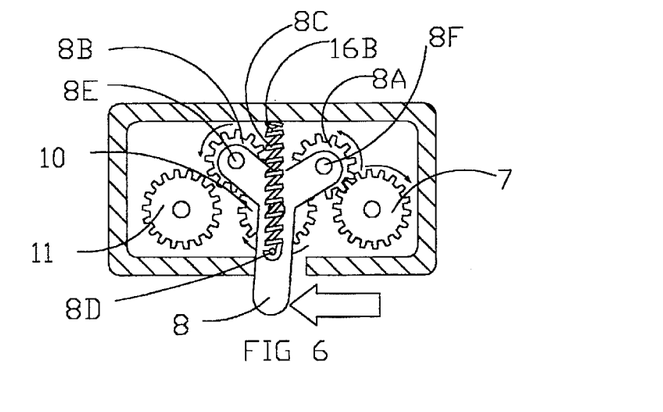
FIG. 6 Sectional view C—C of FIG. 3; output-selector-mechanism is retained in engagement with forward-rotation-mechanism; regardless of direction-of-rotation applied to input, forward drive will always be produced with input and output selectors simultaneously engaged with forward-rotation-mechanism.
Figure 11:
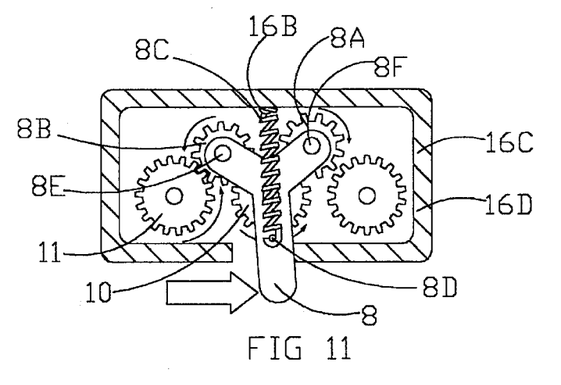
FIG. 11 Sectional view F—F of FIG. 7; output-selector-mechanism is retained in engagement with reverse-rotation-mechanism, regardless of direction-of-rotation applied to input, reverse drive will always be produced with input and output selectors simultaneously engaged with recourse-rotation-mechanism.

In FIG. 6 post 8D is pressed into bore provided centered and half-way up handle of output selector 8. Hook 16B is provided on inside lower wall of housing back-section 16C. Extension-spring 8C is stretchedly attached to post 8D and hook 16B. As handle of output-selector 8 is pushed to the left as shown in FIG. 6, planetary-gear 8A, constantly engaged with gear 10, rolls into engagement with gear 7 to cause clockwise rotation at the output. Extension-spring 8C, constantly under load, maintains the engagement between planetary-gear 8A and gear 7 by providing a torque on output-selector 8. As handle of output selector 8 is pushed to the right as shown in FIG. 11 planetary-gear 8B, constantly engaged with gear 10, rolls into engagement with gear 11 to cause counter clockwise rotation at the output. Extension-spring 8C constantly under load maintains the engagement between planetary-gear 8B and gear 11.

Figure 13A:
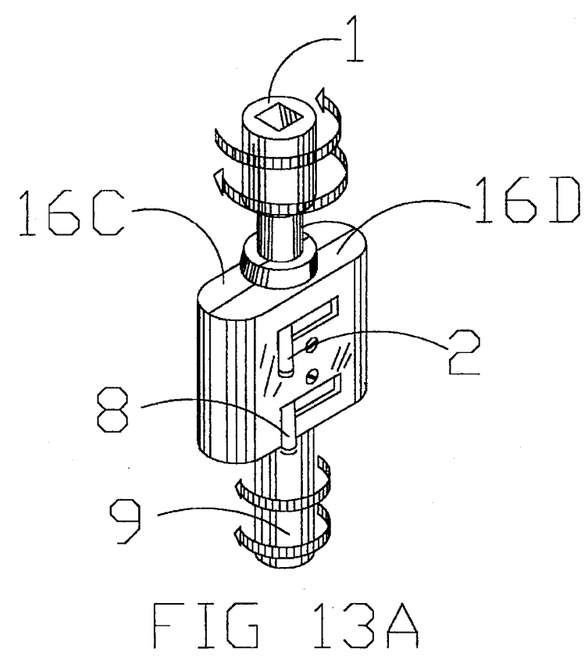
FIG. 13A A suggested configuration of the mechanism showing forward and reverse rotational-motions applied to the input-member with input and output selectors simultaneously engaged with the forward-rotation-mechanism to produce forward drive.
Figure 13B:
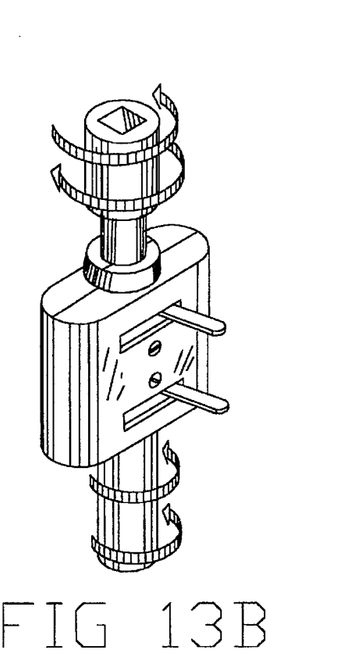
FIG. 13B A suggested configuration of the mechanism showing forward and reverse rotational-motions applied to the input-member with input and output selectors simultaneously engaged with the reverse-rotation-mechanism to produce reverse drive.
Figure 14:
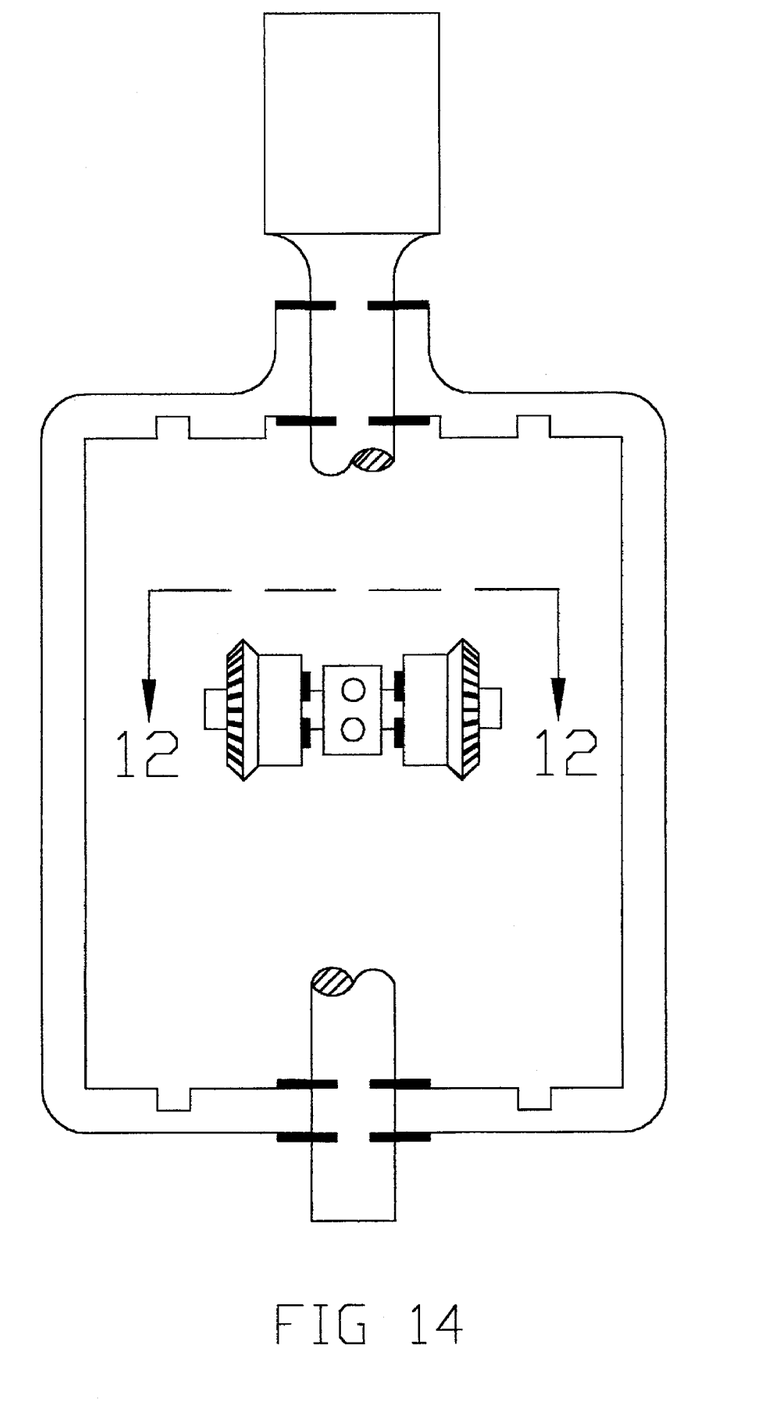
FIG. 14 Front view of center-support-member supporting shaft 5A with a mitre gear mounted to both ends of shaft.

Cylindrical output-member 9 is rotatably retained in output bore provided in housing assembly back-section 16C/front-section 16D of FIG. 13A with retaining rings 9A and 9B of FIG. 1 provided at the external and internal surface of output bore. Gear 10 is pressed into larger diameter of the end of output-member internal of housing. Output-selector-mechanism 8 is pivotably mounted onto smaller diameter of the end of output-member internal of housing and rests on the shoulder of larger diameter and retained in place with retaining ring 9C.

Figure 12:
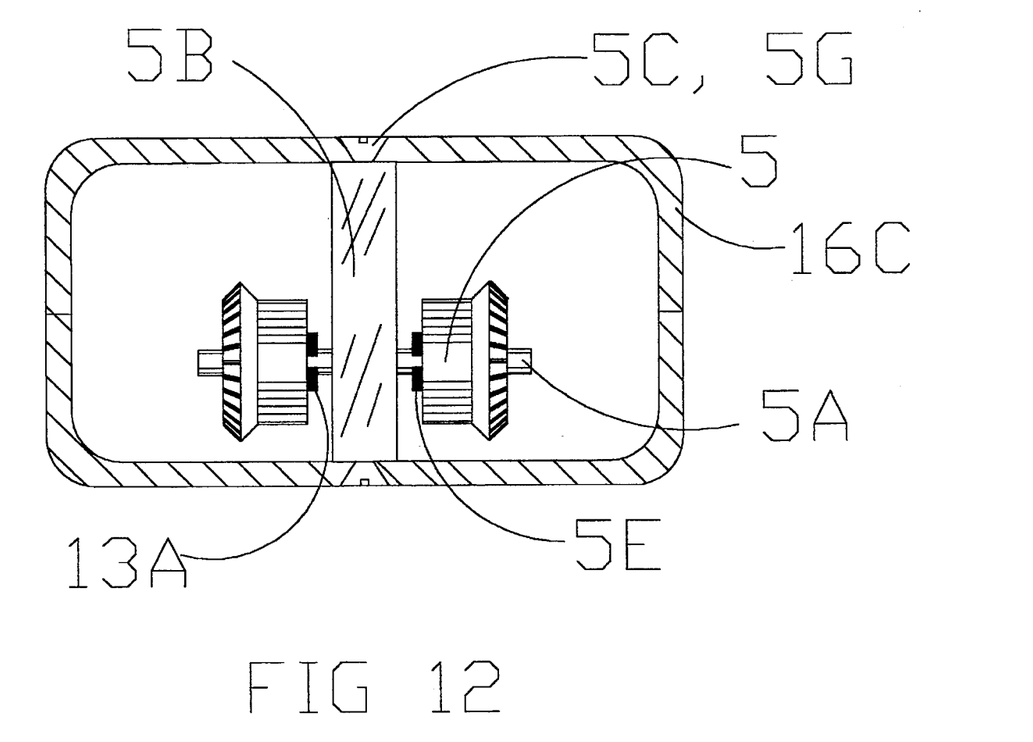
FIG. 12 Sectional view G—G of FIG. 14 shows center-support-member securing back-section of housing to front-section using screws while supporting shaft with mitre gears mounted.

Rectangular center-support-bar 5B of FIG. 12 makes surface contact with the inside wall of housing back-section 16C and inside wall of housing front-section 16D and is provided with two threaded holes bores at each end of center-support-bar 5B for receiving screws 5C and 5G at one end and two screws 5E and 5H at the opposite end to prevent axial rotation of center-support-bar 5B. Shaft 5A is pressed into horizontal bore provided in center-support-bar 5B with equal lengths of shaft 5A projecting out from both sides of center-support-bar 5B and perpendicular to shaft 3 and shaft 15. Bevel-gear 5 is rotatably mounted to one end of shaft 5A and retained in place with retaining ring 5E with bevel-gear 5 facing shaft 3. Bevel-gear 13 is rotatably mounted to opposite end of shaft 5A, facing shaft 15 and retained in place with retaining ring 13A.

In FIG. 13A, housing consists of a square shaped container for its back-section 16C and an equal-size square-shaped container for its front-section 16D. Centered at one end of housing back-section 16C/front-section 16D assembly a bore is provided for containment of input-member 1. Centered at the other end of housing assembly a bore is provided for containment of output-member 9. Centered on the outside surface of back-section 16C and centered on the outside surface of front-section 16D is a pair of countersunk through holes for the installation of counter sink screws 5C and 5G and 5D and 5H respectively. Countersink screws 5C and 5G are inserted through the pair of countersunk through-holes of back-section 16C and screwed into pair of threaded bores in the end of center support-bar 5B. Countersink screws 5D and 5H are inserted through the pair of countersunk through-holes of front-section 16D and screwed into pair of threaded bores in the opposite end of center-support-bar 5B. The installation of screws 5C, 5G, 5D, 5H through the back-section 16C and front-section 16D and into the threaded holes of center-support-bar 5B fastens the back-section to the front-section and thereby secures the entire assembly together.

Horizontally-disposed at the input end of housing front-section 16D of FIG. 13A is a rectangular slot through which the handle of the input-selector-mechanism extends. Horizontally-disposed at the output end of housing front-section 16D of FIG. 13A is a rectangular slot through which the handle of the output-selector-mechanism extends.

Bevel-gear 5 remains in constant engagement simultaneously with compound-gear 4A/roller-clutch 4B assembly and bevel-gear 6A/roller-clutch 6B assembly. Bevel-gear 13 remains in constant engagement simultaneously with compound-gear 14A/roller-clutch 14B assembly and bevel-gear 12A/roller-clutch 17B assembly. Only one of the gear/clutch assemblies at-a-time and rotatably mounted to the same shaft can cause the shaft to rotate. That is, while one gear/clutch assembly is caused to clutch and drive the shaft the other gear/clutch assembly is caused simultaneously to rotate oppositely and thereby override the shaft.

Aforementioned roller-clutches 4B and 6B are disposed so as to clutch and drive shaft 3 only in clockwise rotation as compound-gear 4A and bevel-gear 6A are alternately caused to rotate clockwise. Therefore, shaft 3 along with associated components 4A, 4B, 5, 6A, 6B and 7 are designated as the clockwise-rotation-mechanism which when engaged drives the output-member 9 in clockwise rotation.

Aforementioned roller-clutches 14B and 12B are disposed so as to clutch and drive shaft 15 only in counter clockwise rotation as compound-gear 14A and bevel-gear 12A are alternately caused to rotate counter clockwise. Therefore shaft 15 along with associated components 14A, 14B, 13, 12A and 11 are designated as the counter clockwise-rotation-mechanism which when engaged drives the output-member in counter clockwise rotation.

In order for the mechanism to operate, the input-selector 2, as shown in FIGS. B and C, and output-selector 8 must be either both engaged with the clockwise-rotation-mechanism or both be engaged with the counter clockwise-rotation-mechanism.

Thus, to achieve clockwise output, input-selector 2 of FIG. 4 is shown with its planetary gear 2A retained in engagement with compound-gear 4A of the clockwise-rotation-mechanism. Extension-spring 2C, constantly under load and attached to post 2D and hook 16A provides a torque on input-selector 2 to retain engagement with compound-gear 4A.

Similarly, output-selector 8 of FIG. 6 is shown with its planetary-gear 8A retained in engagement with gear 7 of the forward-rotation-mechanism and gear 10. Extension-spring 8C constantly under load and attached to post 8D and hook 16B provides a torque on output-selector 8 to retain engagement with gear 7 and gear 10.

Figure 2:
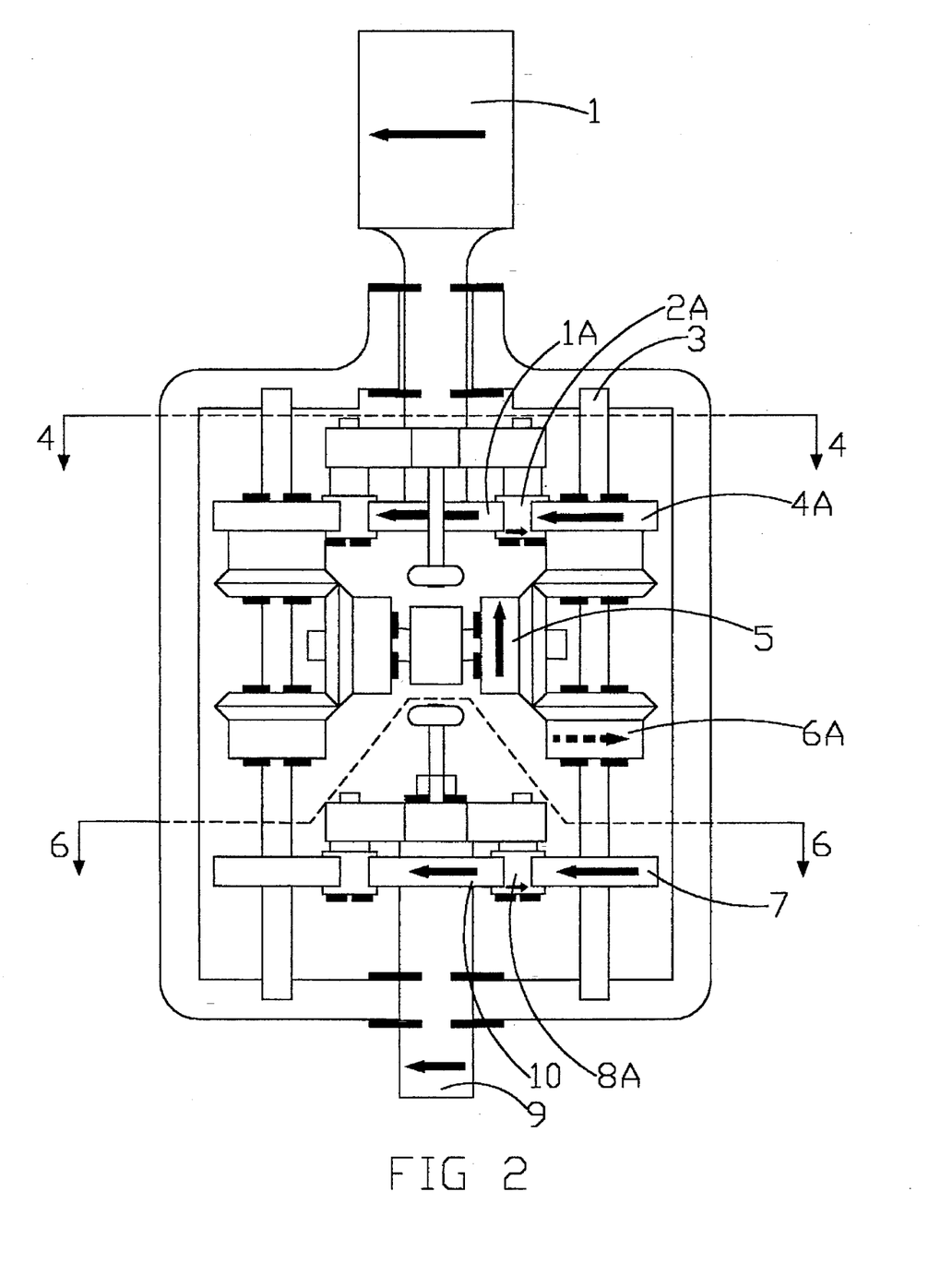
FIG. 2 Arrows indicate direction of-rotation of components; forward-rotation is applied to input, transferred to forward-rotation-mechanism, forward drive is produced.

Referring to FIG. 1, FIG. 2, FIG. 4, FIG. 6,

Forward-rotation is applied to input-member 1 of FIG. 1 and FIG. 2,

Gear 1A is caused to rotate forward, FIG. 1, FIG. 2, FIG. 4,

Planetary-gear 2A is caused to rotate in reverse, FIG. 1, FIG. 4,

Compound-gear 4A/roller-clutch 4B assembly is caused to rotate forward to clutch and drive shaft 3 forward, FIG. 1, FIG. 2, FIG. 4, Bevel-gear 5 is caused to rotate forward, FIG. 1, FIG. 2, Bevel-gear 6A/roller-clutch 6B assembly is caused to rotate in reverse to override shaft 3 indicated by dashed-arrow, FIG. 1, FIG. 2, Gear 7 is caused to rotate forward, FIG. 1, FIG. 2, FIG. 6, Planetary-gear 8A is caused to rotate in reverse, FIG. 1, FIG. 6, Gear 10 and output-member 9 are caused to rotate forward, FIG. 1, FIG. 2.

Figure 3:
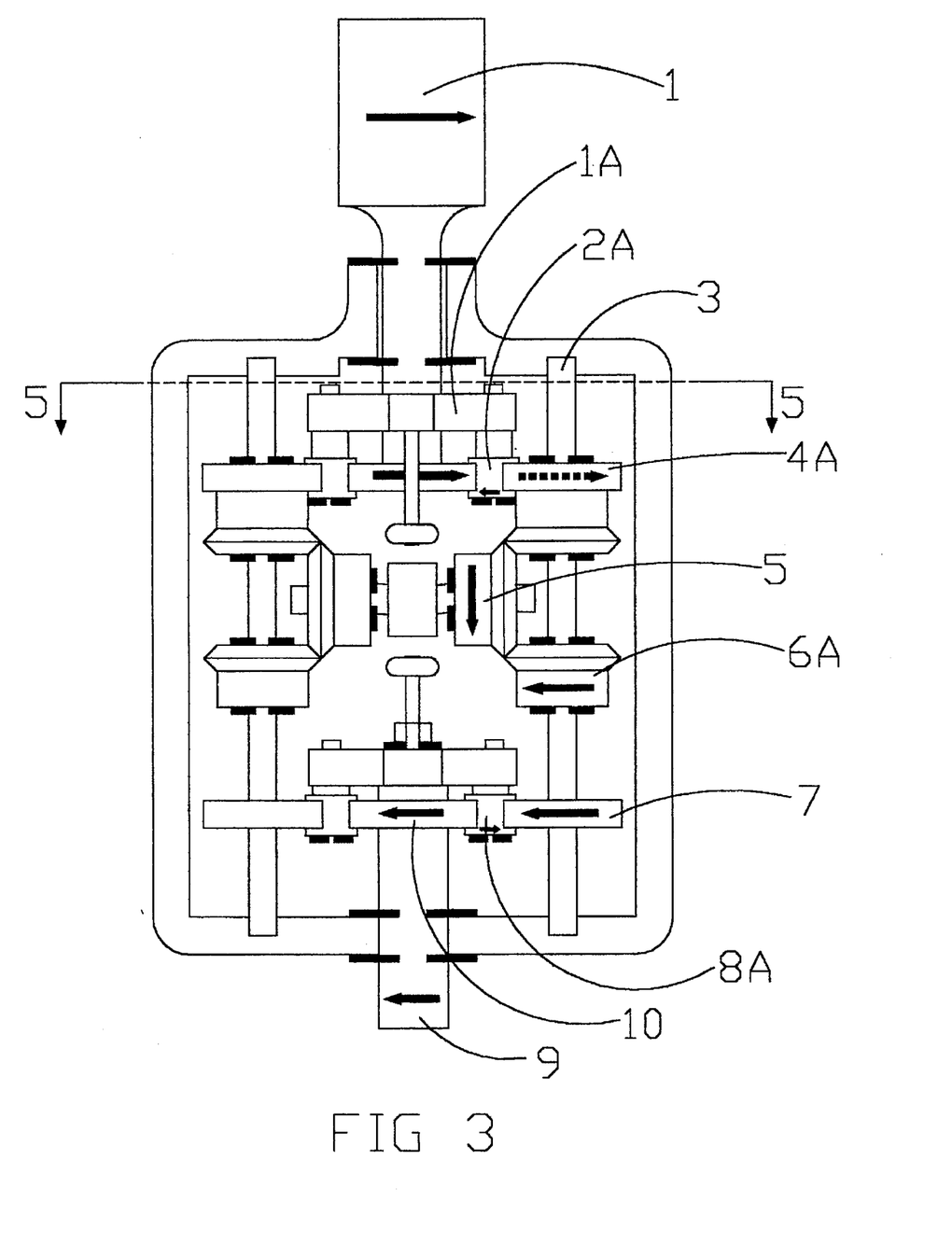
FIG. 3 Arrows indicate direction-of-rotation of components; reverse-rotation is applied to input, transferred to forward-rotation-mechanism, converted to forward-rotation, forward drive is produced.

Referring to FIG. 1, FIG. 3, FIG. 5, FIG. 6,

Reverse-rotation is then applied to input-member 1, FIG. 1, FIG. 3,

Gear 1A is caused to rotate in reverse, FIG. 1, FIG. 3, FIG. 5,

Planetary-gear 2A is caused to rotate forward, FIG. 1, FIG. 3, FIG. 5,

Compound-gear 4A/roller-clutch 4B assembly is caused to rotate in reverse to override shaft 3 indicated by dashed-arrow, FIG. 1, FIG. 3, FIG. 4, Bevel-gear 5 is caused to rotate in reverse, FIG. 1, FIG. 3, Bevel-gear 6A/roller-clutch 6B assembly is caused to rotate forward to clutch and drive shaft 3 forward, FIG. 1, FIG. 3, Gear 7 is caused to rotate forward, FIG. 1, FIG. 3, FIG. 6, Planetary-gear 8A is caused to rotate in reverse, FIG. 1, FIG. 3, FIG. 6, Gear 10 and output-member 9 are caused to rotate forward, FIG. 1, FIG. 3, FIG. 6.

Figure 9:
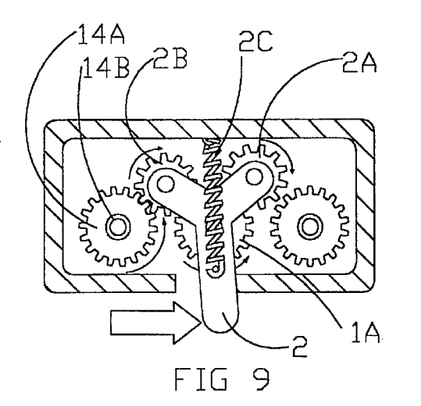
FIG. 9 Sectional view D—D of FIG. 7; input-selector-mechanism is engaged with reverse-rotation-mechanism with reverse-rotation applied to the input.

Thus to achieve reverse output, input selector 2 of FIG. 9 is shown with its planetary-gear 2B retained in engagement with compound gear 14A of the reverse-rotation-mechanism. Extension-spring 2C constantly under load and attached to post 2D and hook 16A provides a torque on selector 2 to retain engagement with compound-gear 14A.

Similarly, output-selector 8 of FIG. 11 is shown with its planetary gear 8B retained in engagement with gear 11 of the reverse-rotation-mechanism. Extension-spring 8C constantly under load and attached to post 8D and hook 16B provides a torque on selector 8 to retain engagement with gear 11.

Figure 7:
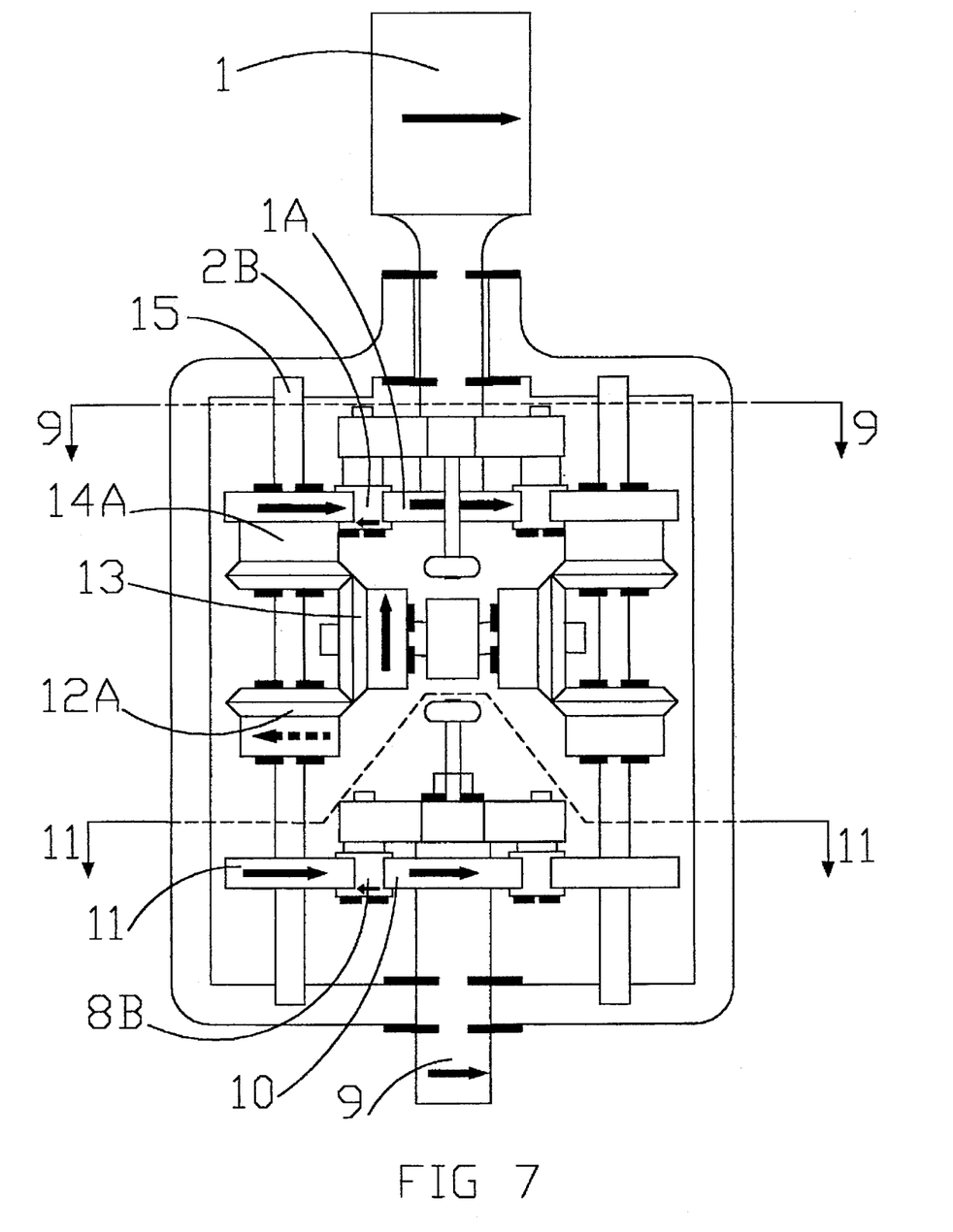
FIG. 7 Arrows indicate direction-of-rotation of components; reverse-rotation is applied to input, transferred to reverse-rotation-mechanism, reverse drive is produced.

Referring to FIG. 1, FIG. 7, FIG. 9, FIG. 11,

Reverse-rotation is applied to input-member 1, FIG. 1, FIG. 7,

Gear 1A is caused to rotate in reverse, FIG. 1, FIG. 7, FIG. 9,

Planetary-gear 2B is caused to rotate forward, FIG. 7, FIG. 9,

Compound-gear 14A/roller-clutch 14B assembly is caused to rotate in reverse to clutch and drive shaft 15 in reverse, FIG. 1, FIG. 7, FIG. 9, Bevel-gear 13 is caused to rotate forward, FIG. 1, FIG. 7, Bevel-gear 12A/roller clutch 12B assembly is caused to rotate forward to override shaft 15 indicated by dashed-arrow, FIG. 1, FIG. 7, Gear 11 is caused to rotate in reverse, FIG. 1, FIG. 7, FIG. 11, planetary-gear 8B is caused to rotate forward, FIG. 1, FIG. 7, FIG. 11

Gear 10 and output-member 9 are caused to rotate in reverse, FIG. 1, FIG. 7, FIG. 11.

Figure 8:
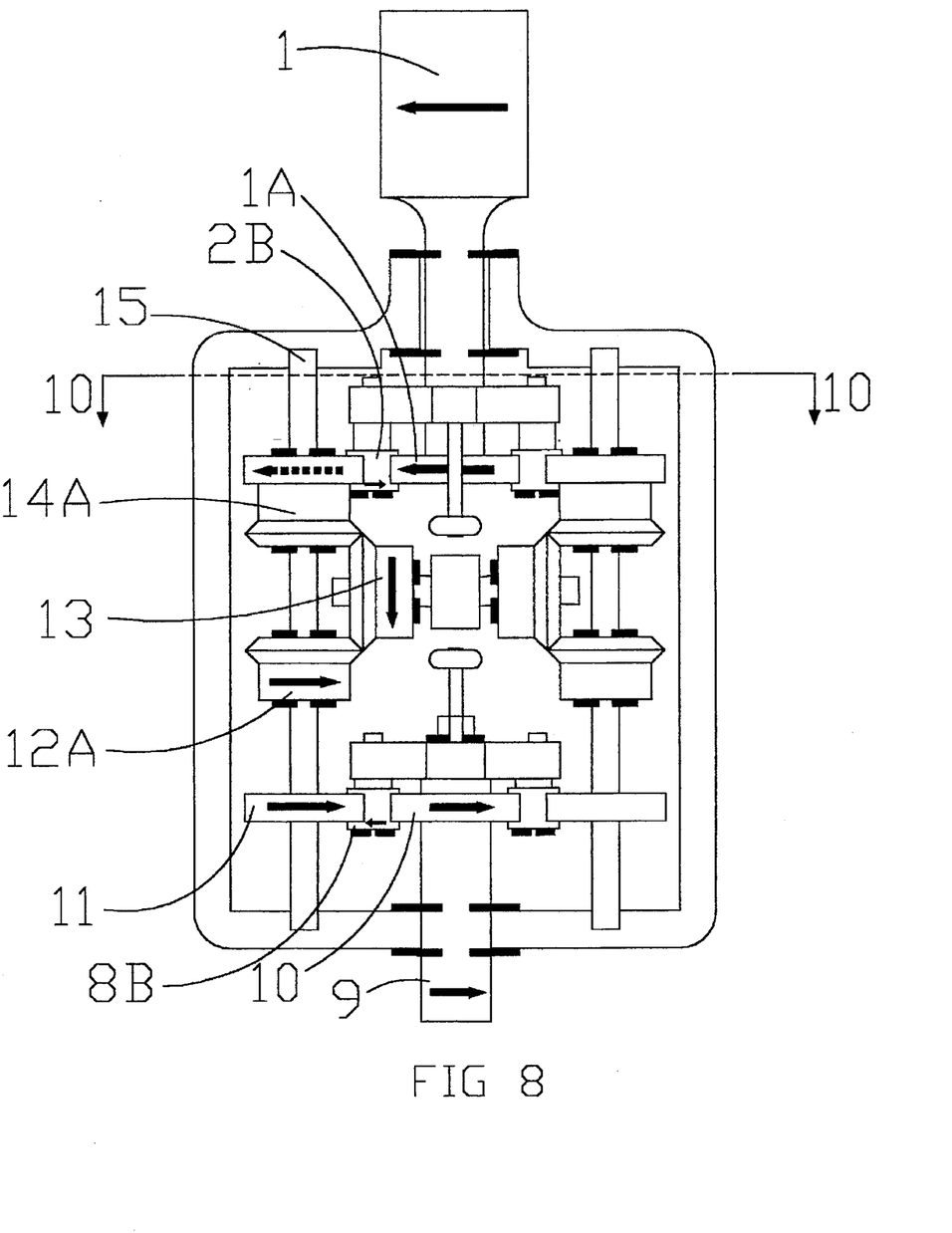
FIG. 8 forward-rotation is applied to input; transferred to reverse-rotation mechanism, converted to reverse-rotation, reverse drive is produced.
Figure 10:
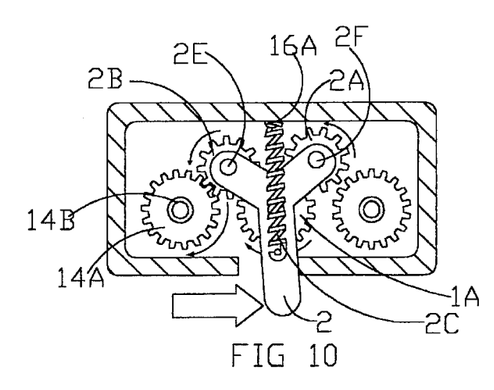
FIG. 10 Sectional view E—E of FIG. 8; input-selector-mechanism is engaged with reverse-rotation-mechanism with forward-rotation applied to the input.

Referring to FIG. 1, FIG. 8, FIG. 10, FIG. 11,

Forward-rotation is applied to input-member 1, FIG. 1, FIG. 8,

Gear 1A is caused to rotate forward, FIG. 1, FIG. 8, FIG. 10,

Planetary-gear 2B is caused to rotate in reverse, FIG. 1, FIG. 8, FIG. 10,

Compound-gear 14A/roller-clutch 14B assembly is caused to rotate forward to override shaft 15 indicated by dashed-arrow, FIG. 1, FIG. 8, Bevel-gear 13, is caused to rotate in reverse to clutch and drive shaft 15 in reverse, FIG. 1, FIG. 8, Gear 11 is caused to rotate forward, FIG. 1, FIG. 8, FIG. 11, planetary-gear 8B is caused to rotate forward, FIG. 1, FIG. 8, FIG. 11, Gear 10 and output-member 9 are caused to rotate in reverse, FIG. 1, FIG. 8, FIG. 11.

While the above description contains many specificities, these must not be construed as limitations on the scope of the invention, but rather as an exemplification of a general configuration thereof.

Numerous other arrangements of mechanical components are possible for causing an output-member to produce forward-rotational-drive from an oscillatory-rotation applied to an input-member by converting reverse-rotational input motion into forward rotational-drive using clutches, gears and shafts and for causing the same output-member to produce reverse-rotational-drive from an oscillatory-rotation applied to the same input-member by converting forward-rotational input motion into reverse-rotational-drive using clutches, gears and shafts as well as numerous other mechanisms for switching to either forward-rotational-drive or reverse rotational-drive all contained in a single embodiment.

What is claimed is:

1. A device for mechanically converting oscillatory-rotation of input to forward-rotational-drive and converting oscillatory-rotation of input to reverse-rotational-drive comprising:

an output-member capable of forward-drive by applying forward, reverse and oscillatory-rotation to an input-member, an output-member capable of reverse-drive by applying forward, reverse and oscillatory rotation to an input-member, a forward-rotation-mechanism for receiving and transferring forward-rotation from input-member to output-member when forward-drive is desired, a forward-rotation-mechanism for receiving reverse-rotation from input-member, converting reverse-rotation into useable forward-rotation then transferring the converted forward-rotation to output member when forward-drive is desired, a reverse-rotation-mechanism for receiving and transferring reverse-rotation from input-member to output-member when reverse-drive is desired, a reverse-rotation-mechanism for receiving forward-rotation from input-member, converting forward-rotation into useable reverse-rotation then transferring the converted reverse-rotation to output member when reverse-drive is desired, a geared and spring-loaded input selector mechanism pivotably mounted onto the internal end of input-member and caused to pivot and become retained into engagement with forward-rotation-mechanism thereby providing the mechanical path for transferring rotational motion from input-member to forward-rotation-mechanism then be caused to pivot out of engagement from forward-rotation-mechanism and become retained into engagement with reverse-rotation-mechanism thereby providing the mechanical path for transferring rotational motion from input-member to reverse-rotation-mechanism.

a geared and spring-loaded output-selector-mechanism pivotably mounted onto the internal end of output-member and caused to pivot and become retained into engagement with forward-rotation-mechanism thereby providing the path for transferring rotational motion from forward-rotation-mechanism to output-member and then be caused to pivot out of engagement from forward-rotation-mechanism and become retained into engagement with reverse-rotation-mechanism thereby providing the mechanical path for transferring rotational motion from reverse-rotation-mechanism to output-member, a three-piece housing for enclosing and supporting aforementioned components.

2. The device of claim 1 wherein input-member (1) is cylindrical, one-piece and of three diameters with the largest diameter being external of housing assembly (16C/16D) for receiving rotary motion, the second largest diameter being rotatably supported in upper bore of housing assembly (16C/16D) and retained in place with retaining ring (1B) at the external end of upper bore and retaining ring (1C) at the internal end of upper bore and the smallest diameter being internal of housing assembly (16C/16D) for pivotably mounting input-selector-mechanism (2) and the pressed-on mounting of gear (1A).

3. The device of claim 1 wherein output-member (9) is cylindrical, one-piece and of two diameters with the larger diameter being rotatably supported in lower output bore of housing assembly (16C/16D) and retained in place with retaining ring (9A) provided at the internal end of output bore and with retaining ring (9B) provided at the external end of output bore with approximately an inch of length of larger diameter extending beyond the external end of output bore for driving hardware with standard attachments while the smaller diameter being internal of housing for the pressed-on mounting of gear (10) and the pivotably mounted output-selector-mechanism (8) resting on the hub of gear (10) and retained in place with retaining ring (9C) provided at the top surface of output-selector-mechanism (8).

4. The device of claim 1 wherein reverse-rotation-mechanism comprises:

shaft (3) disposed parallel to input-member (1) and rotatably retained at both its ends in cylindrical cavities provided at the input and output end at the far right side of housing-assembly (16C/16D).

a compound-gear (4A) consisting of a ring gear for receiving rotary motion from planetary-gear (2A), pressed flush onto hub of a bevel-gear, with one-way roller clutch (4B) disposed so as to clutch and drive shaft (3) only in forward-rotation pressed into bore of bevel-gear with the resulting compound-gear (4A)/roller-clutch (4B) assembly disposed at the upper end of shaft (3) with the bevel-gear facing the output and retained inplace with rotating rings (4C) and (4D).

bevel-gear (6A) disposed at the middle of shaft (3) and facing the bevel-gear of compound-gear (4A)/roller-clutch (4B) assembly with its own one-way roller-clutch (6B) disposed so as to clutch and drive shaft (3) only in forward-rotation, pressed into its bore and retained in place with retaining rings (6C) and (6D), bevel-gear (5) rotatably mounted onto shaft (5A) disposed perpendicular to shaft (3) and retained in place with retaining ring (5E) and permanently engaged simultaneously with compound gear (4A) and bevel-gear (6A) to cause their opposite rotation and thus the alternate clutching and driving of shaft (3) in forward-rotation, gear (7) pressed onto output end of shaft (3), below bevel-gear (6A) roller clutch (6B) assembly, for transferring clockwise rotation to planetary-gear (8A) of output-selector-mechanism (8).

5. The device of claim 1 wherein the reverse-rotation-mechanism comprises:

shaft (4) disposed parallel to shaft (3) and rotatably retained in at both its ends in cylindrical cavities provided at the input and output end at the far left side of housing assembly (16C/16D), a compound-gear (14A) consisting of a ring gear for receiving rotary motion from planetary-gear (2B), pressed flush onto hub of a bevel-gear, with one-way roller-clutch (14B) disposed as as to clutch and drive shaft (15) only in reverse-rotation pressed into bore of bevel-gear with the resulting compound-gear (14A)/roller-clutch (14B) assembly disposed at the upper end of shaft (15) and retained in place with retaining rings (14C) and (14D) and with the bevel gear facing the output end, bevel-gear (12A) disposed at the middle of shaft (15) and facing the bevel-gear of compound-gear (14A)/roller-clutch (14B) assembly with its own one-way roller-clutch (12B) disposed so as to clutch and drive shaft (15) only in reverse-rotation, pressed into its bore and retained in place with retaining rings (12C) and (12D), bevel-gear (13) rotatably mounted onto shaft (5A) disposed perpendicular to shaft (15) and retained in place with retaining ring (5H) and permanently engaged simultaneously with compound-gear (14A) and bevel-gear (12A) to cause their opposite rotation and thus their alternate clutching and driving of shaft (15) only in reverse-rotation gear (11) pressed onto output end of shaft (15), below mitre-gear/roller-clutch assembly (2A/12B), for transferring reverse-rotation to planetary-gear (8B) of output-selector-mechanism.

6. The device of claim 1 wherein input-selector-mechanism comprises:

a Y-shaped-member (2) provided with a centralized bore for being pivotably mounted onto smallest internal diameter of input-member (1) and resting on the hub of gear (1A) while a bore provided near the end of each leg of Y-shaped member (2) has cylindrical post (2F) pressed into one bore and cylindrical post (2E) pressed into the other bore with each post having a thin larger diameter shoulder at their middle for bottoming against underside of Y-shaped-member to prevent posts from becoming pressed too far into their respective boren while planetary-gear (2A) is rotatably mounted to free end of post (2F) for receiving rotary motion from gear (1A) and transferring it to compound-gear (4A) and retained in place on post (2F) with retaining ring (2C) and with gear (2B) rotatably mounted onto free end of post (2E) for receiving rotary motion from gear (1A) while being retained in place on post (2E) with retaining ring (2F) and transferring it to compound-gear (14A) while extension-spring (2C) is stretchedly hooked at one end of free end of post (2D) pressed into bore provided at middle of input-selector-mechanism handle and hooked at opposite end to hook (16A) on inside wall of housing back-section (8C) thereby providing a clockwise torque on on input-selector-mechanism (2) for retaining planetary-gear (2A) in engagement with compound-gear (4A) to produce forward-drive and providing a counter-clockwise torque on input-selector-mechanism (2) for retaining planetary-gear (2B) in engagement with compound-gear (14A) to produce counter-clockwise output while planetary-gear (2A) is in permanent mesh with gear (1A) and caused to roll clockwise along gear (1A) and into simultaneous engagement with compound-gear (4A) thereby activating the forward-rotation-mechanism and with planetary-gear (2B) also being in permanent mesh with gear (1A) and caused to roll counter-clockwise along gear (1A) and into simultaneous engagement with compound-gear (14A) thereby activating the reverse-rotation-mechanism.

7. The device of claim 1 wherein the output-selector-mechanism comprises:

a Y-shaped-member (8) provided with the centralized bore for being mounted pivotably onto smaller internal diameter of output-member (9), resting on shoulder of internal end of larger diameter of output-member (9) and retained in place with retaining ring (9C) with a bore provided near the end of each leg of Y-shaped-member (8), cylindrical post (8F) pressed into bore of one leg of Y-shaped-member and cylindrical post (8E) pressed into other bore of other leg with each post (8F) and (8E) having a thin larger diameter shoulder at their middle for bottoming against underside of Y-shaped-member to prevent posts from becoming pressed too far into their respective bores, planetary-gear (8A) rotatably mounted onto free end of post (8F) and retained in place with retaining ring (8G) and in permanent mesh with gear (10) and caused to roll along gear (10) in clockwise rotation and into simultaneous mesh with gear (7) to cause forward-drive by receiving rotary motion from gear (7) and transferring it to gear (10), planetary-gear (8B) rotatably mounted onto free end of post (8E) and retained in place with retaining ring (8H) and in permanent mesh with gear (10) and caused to roll counter-clockwise along gear (10) and into simultaneous mesh with gear (11) to cause reverse-drive by receiving counter-clockwise rotary motion from gear (11) and transferring it to gear (10), extension-spring (8C) stretchedly hooked at one end of post (8D) pressed into bore provided at middle of output-selector-mechanism handle and hooked at opposite end to hook (16B) on inside wall of housing back-section (16C) and thereby disposed for providing a clockwise torque on output-selector-mechanism (8) for retaining planetary-gear (8A) in engagement with gear (7) to produce forward-drive and providing a counter-clockwise torque on output-selector-mechanism (8) for retaining planetary-gear (8B) in engagement with gear (11) to produce reverse-drive.

8. The device of claim 1 wherein three-piece-housing comprises:

a square-shaped container-like back-section (16C) having a semi-circular channel centered at the input end and serving as the back half of the input bore, semi-circular channel centered at the output end and serving as the back half of the output bore, internal semi-circular recesses parallel with the equal-distance to the left and right of semi-circular input and output channels and serving as the back half of the cylindrical cavities for rotatably retaining both ends of shafts (3) and (15) with a pair of through-holes at the middle of back-section (16C) through which a pair of screws (5C) and (5C) are inserted to mate with a pair of tapped holes disposed at the back end of center-support-member (5) to prevent rotation of center support-member (5) whose one of three functions is to assist securing the complete mechanism and housing together from the posterior and maintain alignment of back-section (16C) with housing front-section (16D) while a second function of center-support-member is to support shaft (5A) which is pressed into a bore provided at approximately half the length of center-support-member and perpendicular to its length so that extending from both its sides are equal lengths of shaft (5A) onto which bevel-gears (5) and (13) are rotatably mounted and retained in place with retaining rings (5E) and (5H) respectively, a square-shaped container like front-section (16D) equal in size for mating with back section (16C) and having a semi-circular channel centered at the input end and serving as the front half of input bore, a semi-circular channel centered at the output end and serving as the front half of output bore, internal semi-circular recesses parallel with an equal-distance to the left and right of semi-circular input and output channels and serving as the front halves of the cylindrical cavities for rotatably retaining both ends of shafts (3) and (15) with a pair of through-holes disposed at the middle of front-section (16D) through which a pair of screws (5D) and (5H) are inserted to mate with a pair of tapped holes disposed at the front end of center-support-member (5) whose third function is to assist securing the complete mechanism and housing together from the anterior and maintaining alignment of back-section with front-section of housing while assisting the support of shaft (5A) and with a horizontally-disposed rectangular slot provided at its input end through which the input-selector-mechanism handle extends and a horizontally-disposed rectangular slot provided at its output end through which the output-selector-mechanism handle extends.

* * * * *